United States Patent [19]

Hasegawa et al.

[11] Patent Number: 5,534,191
[45] Date of Patent: Jul. 9, 1996

[54] TETRADECAHEDRAL RARE EARTH ACTIVATED ALKALINE EARTH METAL FLUOROHALIDE PHOSPHOR AND RADIAITON IMAGE STORAGE PANEL

[75] Inventors: Kazuhiro Hasegawa; Kenji Takahashi; Yasushi Kojima, all of Kanagawa, Japan

[73] Assignee: Fuji Photo Film Co., Ltd., Kanagawa, Japan

[21] Appl. No.: 364,260

[22] Filed: Dec. 27, 1994

[30] Foreign Application Priority Data

Dec. 27, 1993 [JP] Japan .................................. 5-348854
Oct. 20, 1994 [JP] Japan .................................. 6-281268

[51] Int. Cl.$^6$ .................................................. C09K 11/61
[52] U.S. Cl. ............................ 252/301.4 H; 252/301.4 R
[58] Field of Search ................. 252/301.4 H; 250/484.4

[56] References Cited

U.S. PATENT DOCUMENTS 4,076,897  2/1978  Joiner, Jr. .................... 252/301.4 H
5,098,813  3/1992  Nakano et al. ................. 252/301.4 H
5,279,765  1/1994  Ferretti ......................... 252/301.4 H Primary Examiner—Melissa Bonner
Attorney, Agent, or Firm—Sixbey, Friedman, Leedom & Ferguson

[57] ABSTRACT

Disclosed is a tetradecahedral rare earth activated alkaline earth metal fluorohalide stimulable phosphor of the formula (I):

$$Ba_{1-x}M^{II}_xFX:yM^I,zLn \qquad (I)$$

wherein $M^{II}$ is Sr or Ca; $M^I$ is Li, Na, K, Rb or Cs; X is Cl, Br or I; Ln is Ce, Pr, Sm, Eu, Gd, Tb, Tm or Yb; and $0 \leq x \leq 0.5$, $0 \leq y \leq 0.05$ and $0 < z \leq 0.2$. Also disclosed are a process for the preparation of the above stimulable phosphor and a radiation image storage panel.

8 Claims, 8 Drawing Sheets

FIG. 1

(PRIOR ART)

TETRADECAHEDRAL RARE EARTH ACTIVATED ALKALINE EARTH METAL FLUOROHALIDE PHOSPHOR AND RADIAITON IMAGE STORAGE PANEL

FIELD OF THE INVENTION

The present invention relates to a new tetradecahedral rare earth activated alkaline earth metal fluorohalide stimulable phosphor and processes for the preparation of the phosphor. The invention also relates to a radiation image storage panel employing the new stimulable phosphor.

BACKGROUND OF THE INVENTION

As a method replacing a conventional radiography, a radiation image recording and reproducing method utilizing a stimulable phosphor is described, for instance, in U.S. Pat. No. 4,239,968, and is practically employed. In the method, a radiation image storage panel containing a stimulable phosphor (i.e., stimulable phosphor sheet) is used, and the method comprises the steps of causing the stimulable phosphor of the panel to absorb radiation energy having passed through an object or having radiated from an object; sequentially exciting the stimulable phosphor with an electromagnetic wave such as visible light or infrared rays (i.e., stimulating rays) to release the radiation energy stored in the phosphor as light emission (stimulated emission); photoelectrically detecting the emitted light to obtain electric signals; and reproducing the radiation image of the object as a visible image from the electric signals. After the residual radiation image is erased from the radiation image storage panel, the panel is kept for the next radiographic process. Thus, the radiation image storage panel is generally employed repeatedly after the recorded image is erased.

In the radiation image recording and reproducing method, a radiation image is obtainable with a sufficient amount of information by applying a radiation to an object at a considerably small dose, as compared with the conventional radiography using a combination of a radiographic film and a radiographic intensifying screen. Further, the method is very advantageous from the viewpoints of conservation of resources and economic efficiency because the radiation image storage panel can be repeatedly used in the method, while the radiographic film in the conventional radiography is consumed for each radiographic process.

The stimulable phosphor absorbs and stores a portion of the radiation energy when exposed to a radiation such as X-rays, and shows stimulated emission when exposed to stimulating rays. In practical use, there are generally utilized phosphors giving stimulated emission within a wavelength region of 300 to 500 nm by exposure to stimulating rays within a wavelength region of 400 to 900 nm. As an example of the stimulable phosphor having been employed for a radiation image storage panel, there can be mentioned a rare earth activated alkaline earth metal fluorohalide phosphor.

The radiation image storage panel employed in the above-described method generally comprises a support and a stimulable phosphor layer provided on one surface of the support. However, if the phosphor layer is self supporting, the support can be omitted.

As the stimulable phosphor layer, there are known not only a phosphor layer comprising a binder and a stimulable phosphor dispersed therein but also a phosphor layer composed of only an agglomerate of a stimulable phosphor containing no binder which is formed by a deposition process or a firing process. Further, there is known a radiation image storage panel having other type of a phosphor layer which has a stimulable phosphor agglomerate having voids impregnated with a polymer material. In any of the above-described phosphor layers, the stimulable phosphor emits light (stimulated emission) when excited with stimulating rays, after having been exposed to radiation such as X-rays. Accordingly, the radiation having passed through an object or radiated from an object is absorbed by the phosphor layer of the panel in an amount proportional to the applied radiation dose, and a radiation image of the object is produced in the panel in the form of a radiation energy-stored latent image. The radiation energy-stored image can be released as stimulated emission by sequentially irradiating the panel with stimulating rays. Thus stimulated emission is then photoelectrically detected to give electric signals, so as to reproduce a visible image from the electric signals.

In the case that the phosphor layer is provided on a support, a film (i.e., protective film) is generally provided on its free surface (surface not facing the support) of the phosphor layer to protect the phosphor layer from chemical deterioration or physical shock.

The above-mentioned rare earth activated alkaline earth metal fluorohalide phosphor is advantageously employed in the recording and reproducing method, because it has high sensitivity and a radiation image storage panel using the phosphor reproduces a radiation image having high sharpness. Nevertheless, further improvements of the stimulable phosphor in its characteristics are desired.

The known process for the preparation of the rare earth activated alkaline earth metal fluorohalide phosphor comprises the steps of mixing its starting materials such as an alkaline earth metal fluoride, an alkaline earth metal halide (except metal halide), a rare earth fluoride and ammonium fluoride in a dry condition or in an aqueous suspension; and if desired, adding sintering inhibitor; firing the mixture and then pulverizing the fired product. Therefore, in the known preparation process, the pulverization step after firing is indispensable, and most of the thus prepared phosphor grains are made in a tabular shape. Consequently, the known rare earth activated alkaline earth metal fluorohalide phosphors are in the form of tabular grains.

Figure 1:
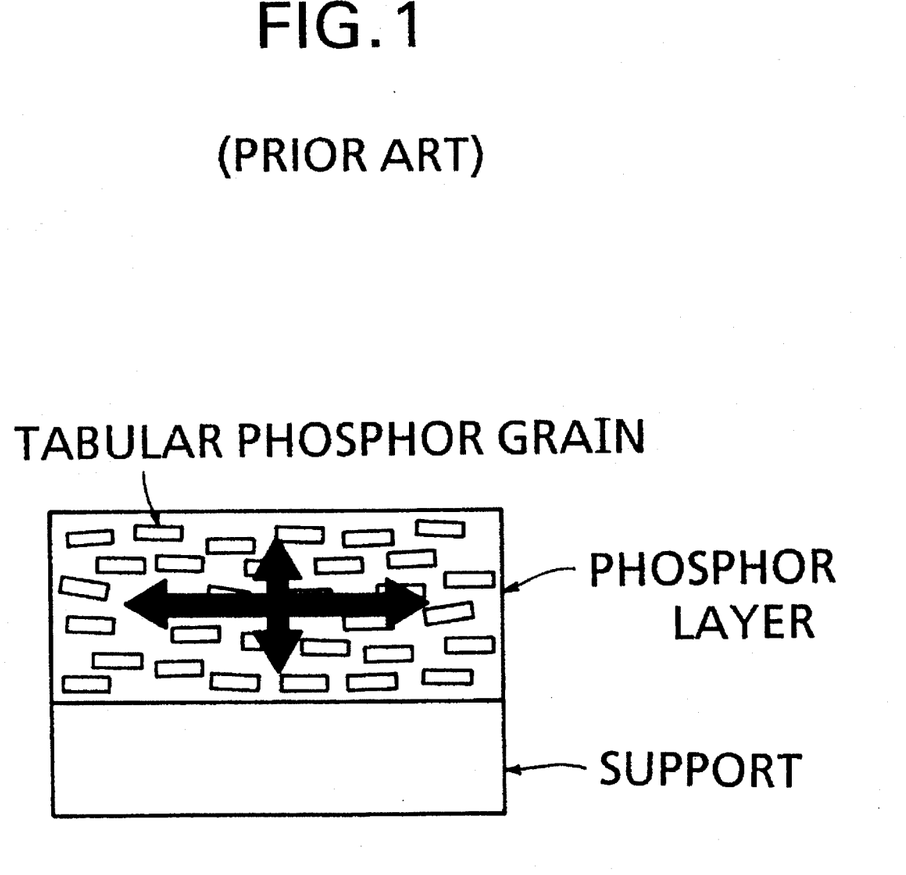
FIG. 1 is a schematic view showing arrangement of conventional tabular rare earth activated alkaline earth metal fluorohalide phosphors in a phosphor layer of a radiation image storage panel, and it also shows directions of light scattering in the phosphor layer.

In the known process for preparing a stimulable phosphor layer, the tabular stimulable phosphor grains and a binder polymer solution are mixed, and the obtained mixture is coated on a support, and dried. In thus prepared phosphor layer, the tabular phosphor grains are likely to be arranged to face parallel to the support surface as is shown in FIG. 1. By the use of thus prepared phosphor layer, a radiation image can be recorded and reproduced by means of the stimulating rays. However, the sharpness of the radiation image reproduced by the use of such phosphor layer is liable to lower, because most of the stimulating rays and most of the stimulated emission are likely to be scattered in the above phosphor layer in the level direction (i.e., direction parallel to the support surface; see the long arrow in FIG. 1).

In order to avoid such lowering of the sharpness of reproduced radiation image, it may be considered to use pseudo-cubic stimulable phosphor grains disclosed in Japanese Patent Provisional Publication No. 62(1987)-86086. However, the reproducibility of the disclosed preparation method of the pseudo-cubic phosphor grains is poor from a viewpoint of industrial production and therefore is inapplicable in industry.

SUMMARY OF THE INVENTION

The object of the present invention is to provide a new rare earth activated alkaline earth metal fluorohalide stimulable phosphor which gives a radiation image having more improved sharpness in the radiation image recording and reproducing method.

There is provided by the present invention a tetradecahedral rare earth activated alkaline earth metal fluorohalide stimulable phosphor represented by the formula (I):

$$Ba_{1-x}M^{II}_xFX:yM^I,zLn \qquad (I)$$

wherein $M^{II}$ is at least one alkaline earth metal selected from the group consisting of Sr and Ca; $M^I$ is at least one alkaline metal selected from the group consisting of Li, Na, K, Rb and Cs (Na and K are particularly preferred); X is at least one halogen selected from the group consisting of Cl, Br and I; Ln is at least one rare earth element selected from the group consisting of Ce, Pr, Sm, Eu, Gd, Tb, Tm and Yb (Ce and Eu are particularly preferred; and x, y and z are numbers satisfying the conditions of $0 \leq x \leq 0.5$, $0 \leq y \leq 0.05$ and $0 < z \leq 0.2$, respectively.

There is also provided by the invention a process of the preparation for a tetradecahedral rare earth activated alkaline earth metal fluorohalide phosphor of the formula (I) [Process-I] which comprises the steps of:

preparing an aqueous solution which contains $BaX_2$, a halide of Ln, a halide of $M^{II}$ (if x in the formula (I) is not 0), and a halide of $M^I$ (if y in the formula (I) is not 0) and in which the concentration of $BaX_2$ is not more than 1.4 mol./l;

adding an aqueous solution of an inorganic fluoride to the above-prepared solution under the condition that the temperature of the prepared solution is kept at 20°–100° C. to precipitate precursor crystals of the tetradecahedral rare earth activated alkaline earth metal fluorohalide phosphor;

separating the precursor crystals from the aqueous solution; and firing the precursor crystals under the condition that the fired crystals are not sintered.

Further provided by the invention is another process of the preparation for a tetradecahedral rare earth activated alkaline earth metal fluorohalide phosphor of the formula (I) [Process-II] which comprises the steps of:

preparing an aqueous solution which contains an ammonium halide, a halide of Ln, a halide of $M^{II}$ (if x in the formula (I) is not 0), and a halide of $M^I$ (if y in the formula (I) is not 0) and in which the concentration of the ammonium halide is in the range of 2.5 mol./l to 4.5 mol./l;

adding an aqueous solution of an inorganic fluoride and an aqueous solution of $BaX_2$ to the above-prepared solution under the conditions that the temperature of the prepared solution is kept at 20°–100° C. and that the amount of fluorine in the former solution and the amount of Ba in the latter solution are controlled to give a constant ratio to precipitate precursor crystals of the tetradecahedral rare earth activated alkaline earth metal fluorohalide phosphor;

separating the precursor crystals from the aqueous solution; and firing the precursor crystals under the condition that the fired crystals are not sintered.

Furthermore provided by the invention is a radiation image storage panel having a stimulable phosphor layer containing the tetradecahedral rare earth activated alkaline earth metal fluorohalide stimulable phosphor of the formula (I).

The radiation image storage panel employing tetradecahedral rare earth activated alkaline earth metal fluorohalide phosphor of the invention gives an image of highly improved sharpness, and therefore it is advantageously used in the radiation image recording and reproducing method.

DETAILED DESCRIPTION OF THE INVENTION

Figure 2:
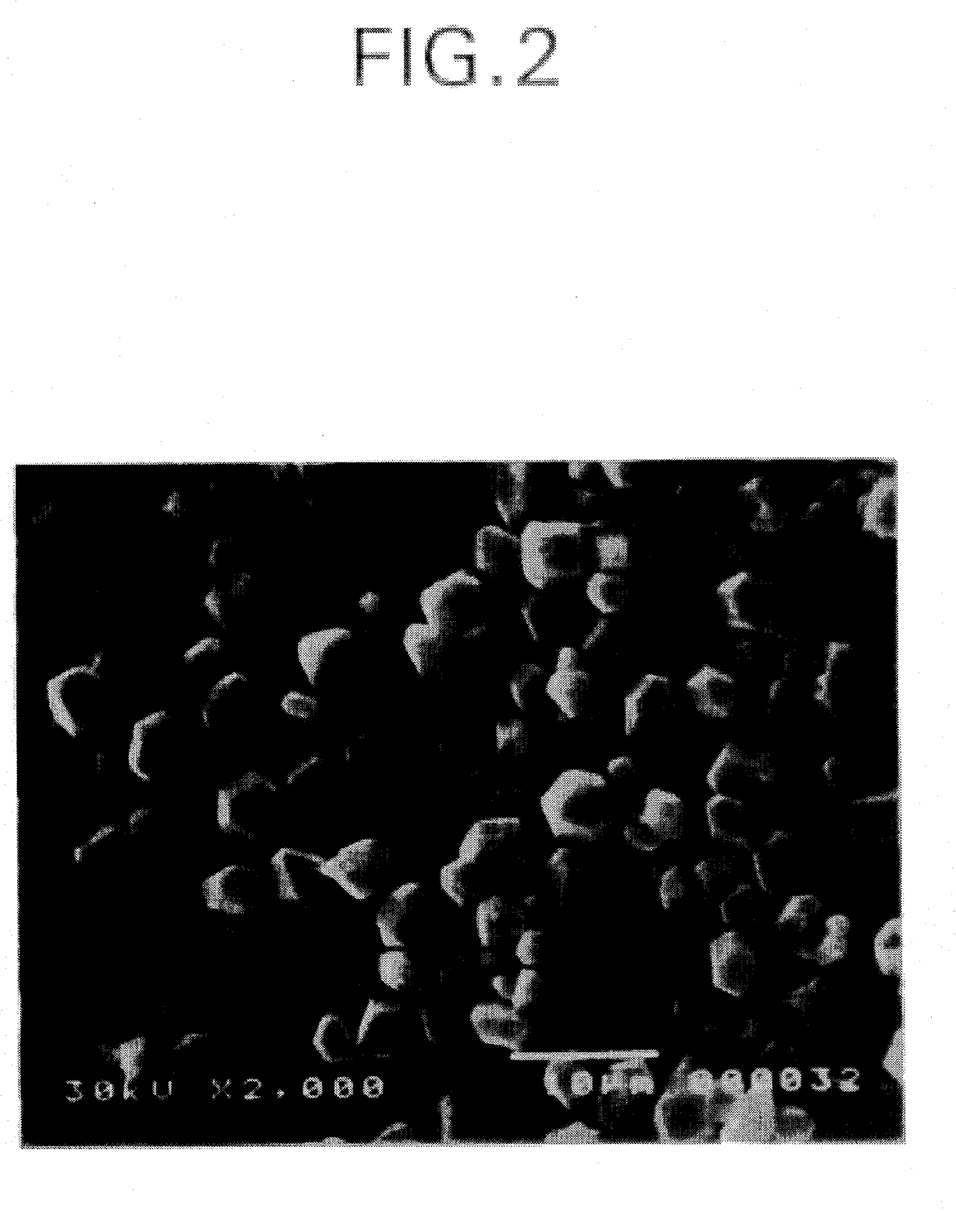
FIG. 2 is an example of electron microscopic photographs of a tetradecahedral rare earth activated alkaline earth metal fluorohalide phosphor of the invention.
Figure 3:
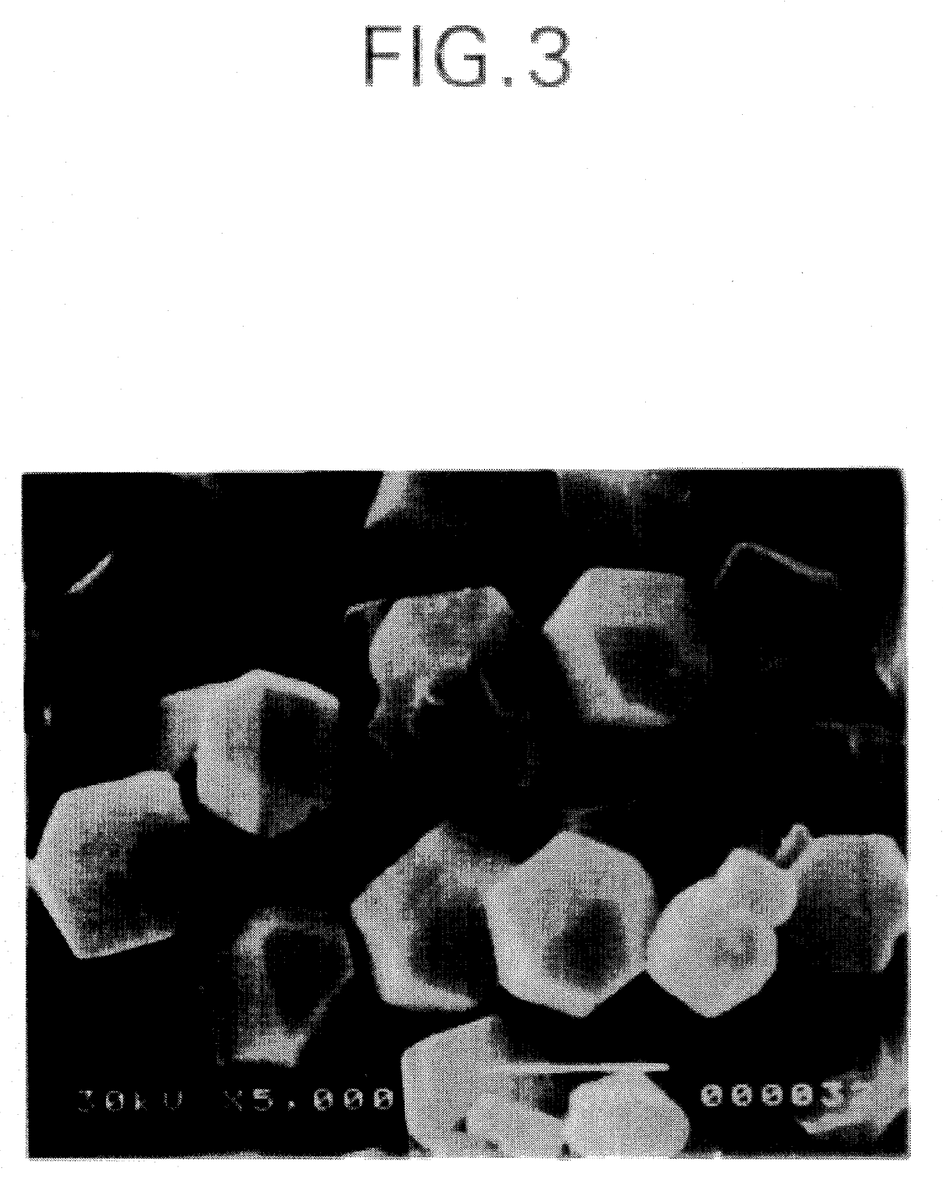
FIG. 3 is a magnified electron microscopic photograph of the tetradecahedral rare earth activated alkaline earth metal fluorohalide phosphor of FIG. 2.
Figure 4:
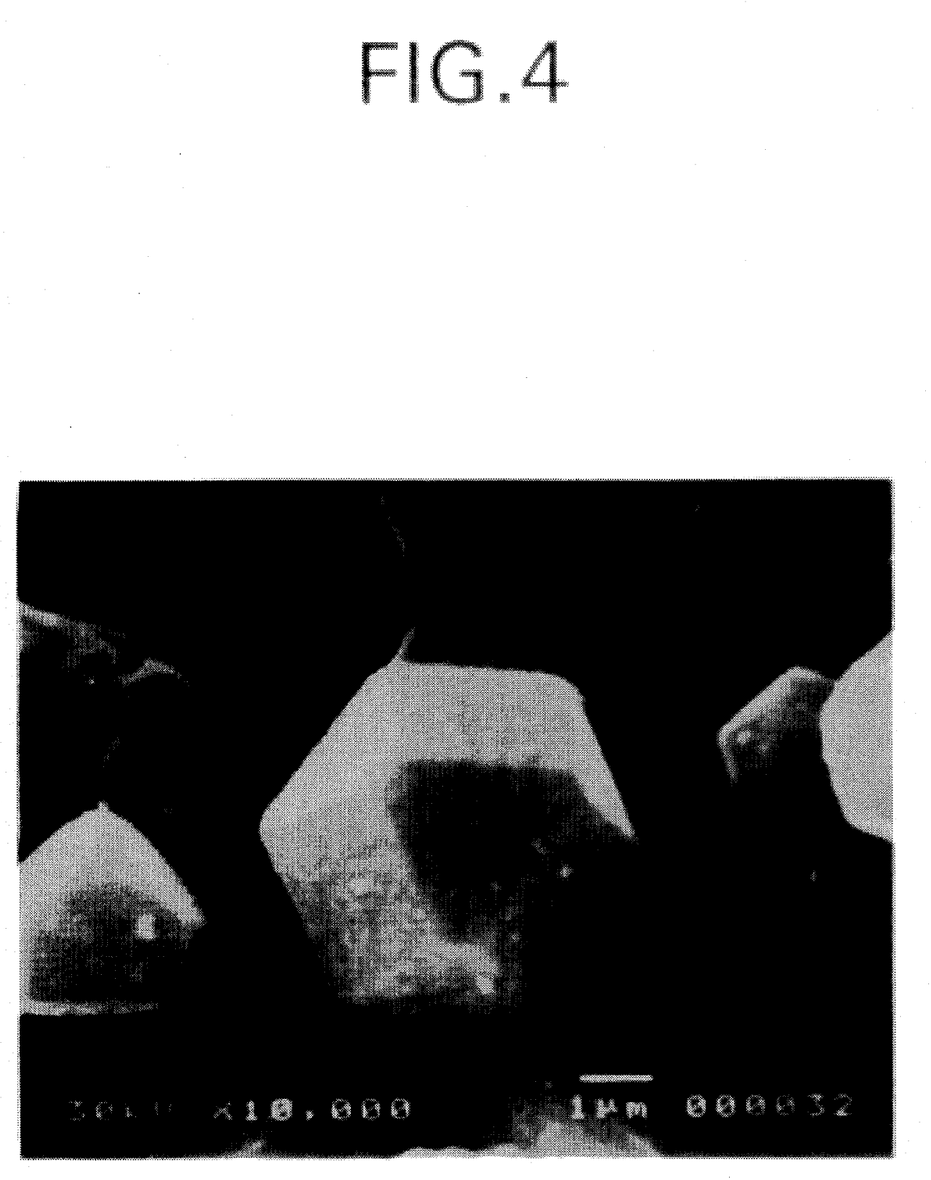
FIG. 4 is a magnified electron microscopic photograph of the tetradecahedral rare earth activated alkaline earth metal fluorohalide phosphor of FIG. 3.
Figure 5:
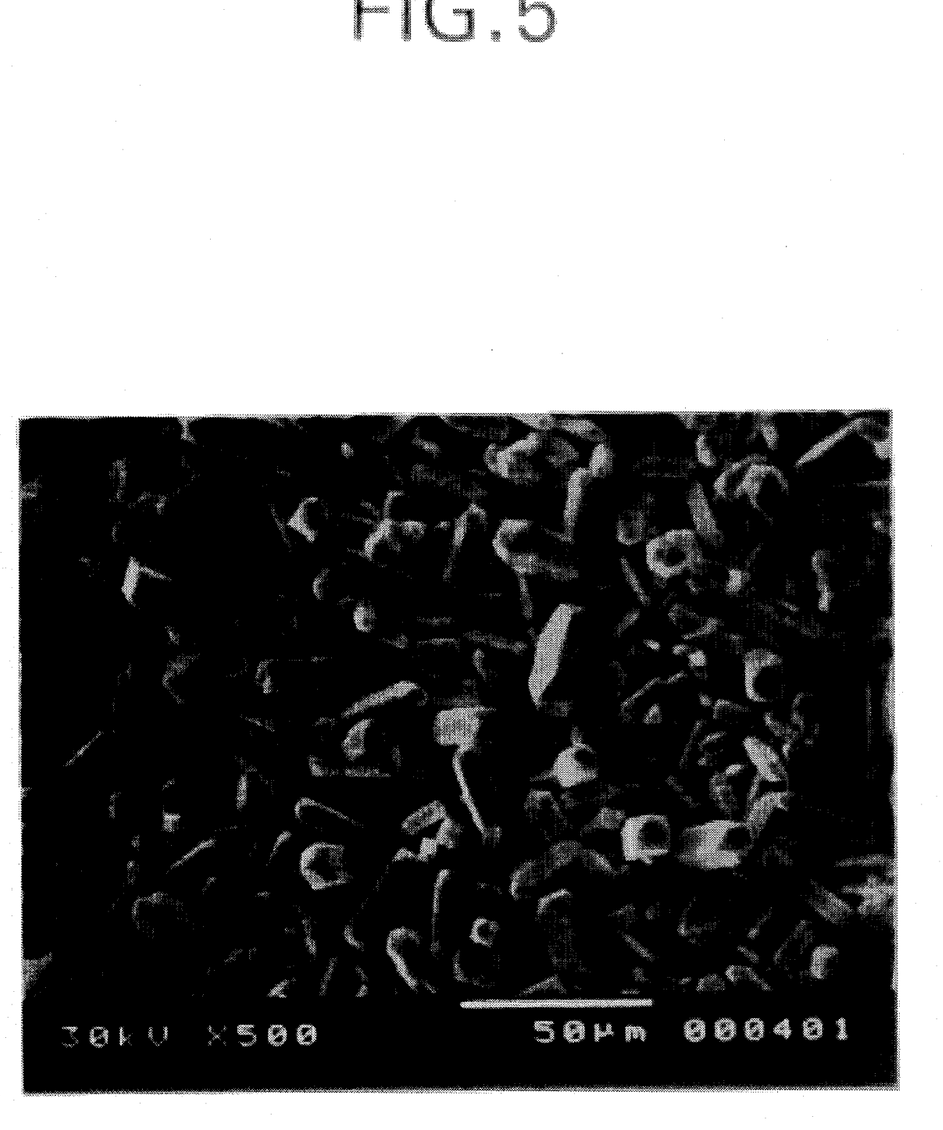
FIG. 5 is an example of electron microscopic photographs of another tetradecahedral rare earth activated alkaline earth metal fluorohalide phosphor of the invention.
Figure 6:
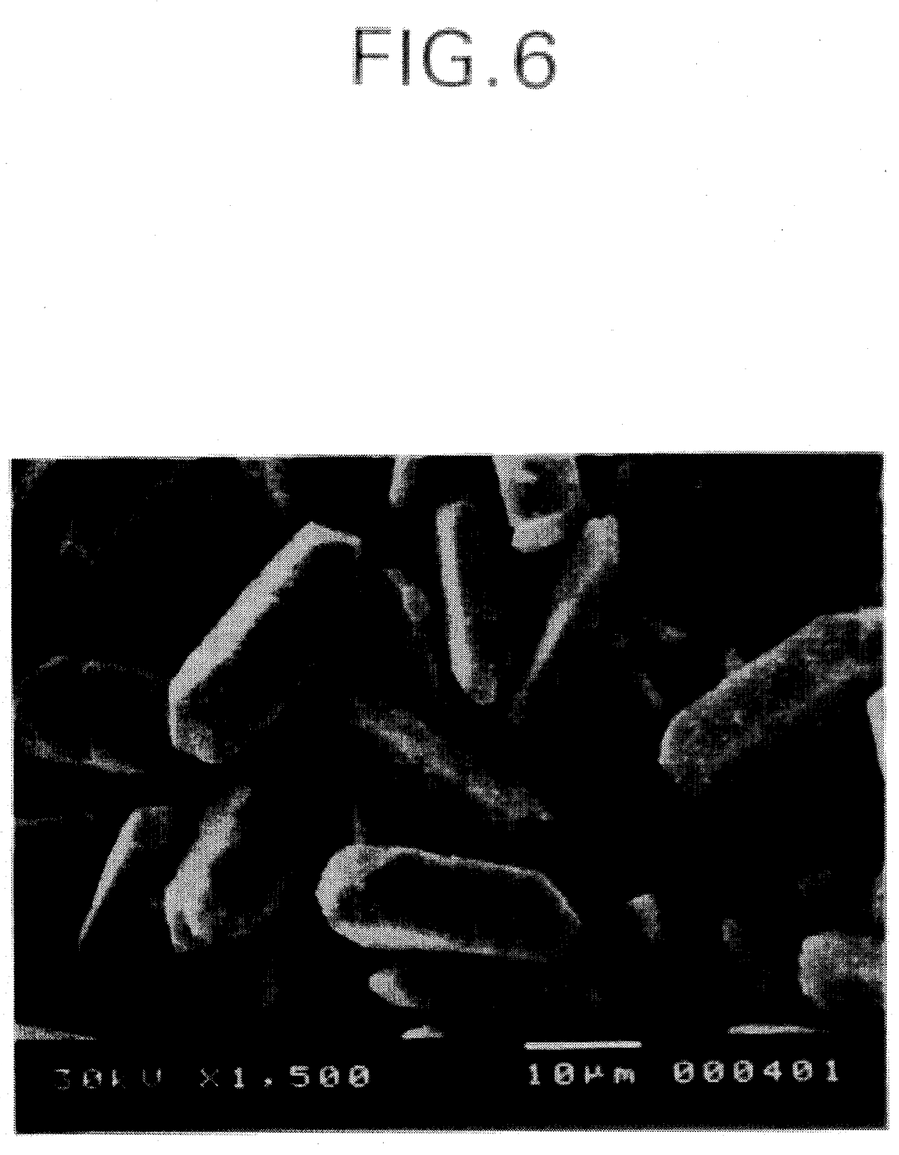
FIG. 6 is a magnified electron microscopic photograph of the tetradecahedral rare earth activated alkaline earth metal fluorohalide phosphor of FIG. 4.

The grains of the tetradecahedral rare earth activated alkaline earth metal fluorohalide phosphor of the present invention have the shape of an intermediate polyhedron between regular hexahedron and octahedron, and the aspect ratio generally is in the range of 1.0–5.0. Process-I is employed specifically for preparing the phosphor having an aspect ratio of 1.0 to 2.0. Typical shapes of the grains having such lower aspect ratio are shown in the photographs of FIGS. 2 to 4. Process-II is employed specifically for preparing the phosphor having an aspect ratio of 2.0 to 5.0. Typical shapes of the grains having such high aspect ratio are shown in the photographs of FIGS. 5 and 6.

As is described above, the tetradecahedral rare earth activated alkaline earth metal fluorohalide phosphor represented by the formula (I) of the invention can be prepared by the process (Process-I) comprising the steps of preparing an aqueous solution which contains $BaX_2$, a halide of Ln, a halide of $M^{II}$ (if x is not 0), and a halide of $M^I$ (if y is not 0) and in which the concentration of ammonium halide is adjusted not higher than 1.4 mol./l; adding an aqueous solution of an inorganic fluoride to the above-prepared solution under the condition that the temperature of the latter solution is kept at 20°–100° C. to precipitate precursor crystals of the tetradecahedral rare earth activated alkaline earth metal fluorohalide phosphor; separating the precursor crystals from the aqueous solution; and firing the precursor crystals under the condition that the fired crystals are not sintered.

The Process-I of the preparation of the phosphor of the present invention will be described hereinafter in more detail.

First, the materials other than fluoride are dissolved in an aqueous medium. $BaX_2$, a halide of Ln, a halide of $M^{II}$ (if necessary) and a halide of $M^I$ (if necessary) are added to an aqueous medium, and dissolved under stirring to prepare an aqueous solution. In this step, the amount of $BaX_2$ and the amount of aqueous medium are adjusted to give an aqueous solution which has a $BaX_2$ concentration of not higher than 1.4 mol./l. To the solution, a small amount of an acid, ammonia, alcohol, water-soluble polymer or fine grains of insoluble metal oxides may be added. The obtained solution (that is, a reaction mother liquid) is kept at 20°–100° C.

Then, an aqueous solution of an inorganic fluoride (such as ammonium fluoride or an alkaline metal fluoride) is added to the above-prepared solution which is kept at 20°–100° C. under stirring. The fluoride solution may be poured into the reaction mother liquid through a pipe equipped with a pumping machine, and preferably the fluoride solution is poured into thus vigorously stirred area of the mother liquid. In the course of the addition, precursor crystals of the tetradecahedral rare earth activated alkaline earth metal fluorohalide phosphor of the formula (I) precipitate.

The obtained precipitate (i.e., precursor crystals) is separated from the solution by a known process such as filtration or centrifugation. The precipitate is then washed with a solvent such as methanol, and dried. To the dried precursor crystals, a sintering inhibitor such as fine grains of alumina or silica is added and mixed so that the inhibitor may be uniformly attached onto the crystal surfaces. If the firing condition is carefully selected, the sintering inhibitor can be omitted. Subsequently, the precursor crystals are charged into a heat-resistant container such as a quartz boat and an alumina crucible, and placed in an electric furnace for firing. The temperature for the firing suitably ranges from 400° to 1,300° C., and preferably ranges from 500° to 1,000° C. The firing period is determined depending on the amount of the mixture of the starting materials or its heat-treated product charged into the heat-resistant container, the firing temperature, the temperature when the fired mixture is taken out of the heat-resistant container, etc. Generally, the firing period ranges from 0.5 to 12 hours. As the firing atmosphere, there can be employed a neutral atmosphere such as a nitrogen gas or argon gas atmosphere, a weak reducing atmosphere such as a nitrogen gas atmosphere containing a small amount of a hydrogen gas or a carbon dioxide gas atmosphere containing a carbon monoxide gas, or an atmosphere into which a small amount of oxygen is introduced.

The above-described process gives the tetradecahedral rare earth activated alkaline earth metal fluorohalide phosphor of the formula (I) specifically having an aspect ratio of 1.0 to 2.0.

As is described above, the tetradecahedral rare earth activated alkaline earth metal fluorohalide phosphor represented by the formula (I) of the invention can be prepared by the process (Process-II) comprising the steps of preparing an aqueous solution which contains an ammonium halide ($NH_4Br$ or $NH_4Cl$), a halide of Ln, a halide of $M^{II}$ (if x is not 0), and a halide of $M^I$ (if y is not 0) and in which the concentration of ammonium halide is adjusted in the range of 2.5 to 4.5 mol./l; adding an aqueous solution of an inorganic fluoride and an aqueous solution of $BaX_2$ to the above-prepared solution under the conditions that the temperature of the prepared solution is kept at 20°–100° C. and that the amount of fluorine in the former solution and the amount of Ba in the latter solution are controlled to give a constant ratio to precipitate precursor crystals of the tetradecahedral rare earth activated alkaline earth metal fluorohalide phosphor; separating the precursor crystals from the aqueous solution; and firing the precursor crystals under the condition that the fired crystals are not sintered.

The Process-II of the preparation of the phosphor of the invention will be described hereinafter in more detail.

First, an ammonium halide ($NH_4Br$ or $NH_4Cl$) and the materials other than $BaX_2$ and fluoride are dissolved in an aqueous medium. In other words, an ammonium halide, a halide of Ln, a halide of $M^{II}$ (if necessary) and a halide of $M^I$ (if necessary) are added to an aqueous medium, and dissolved under stirring to prepare an aqueous solution. In this step, the amount of ammonium halide and the amount of aqueous medium are adjusted to give an aqueous solution which has an ammonium halide concentration in the range of 2.5 to 4.5 mol./l. To the solution, a small amount of an acid, ammonia, alcohol, water-soluble polymer or fine grains of insoluble metal oxides may be added. The obtained solution (that is, a reaction mother liquid) is kept at 20°–100° C.

Then, an aqueous solution of an inorganic fluoride (such as ammonium fluoride or an alkaline metal fluoride) and an aqueous solution of $BaX_2$ are added to the above-prepared solution which is kept at 20°–100° C. with stirring under the condition that the amount of fluorine in the former solution and the amount of Ba in the latter solution are controlled to give a constant ratio. The fluoride solution and $BaX_2$ solution may be poured into the reaction mother liquid through a pipe equipped with a pumping machine, and preferably the fluoride solution and the $BaX_2$ solutions are poured into thus vigorously stirred area of the mother liquid. Thus, the reaction ought to proceed under the condition that the amount of Ba ion in the resulting product is not excessive. In the course of the addition, precursor crystals of the tetradecahedral rare earth activated alkaline earth metal fluorohalide phosphor of the formula (I) precipitate.

The obtained precipitate (i.e., precursor crystals) is separated from the solution in the manner as described for Process-I.

This process-II gives the tetradecahedral rare earth activated alkaline earth metal fluorohalide phosphor of the formula (I) specifically having an aspect ratio of 2.0 to 5.0.

The process for the preparation of the radiation image storage panel of the invention will be described below.

The radiation image storage panel generally comprises a support and a stimulable phosphor layer provided thereon. The stimulable phosphor layer of the invention is a layer containing the tetradecahedral rare earth activated alkaline earth metal fluorohalide phosphor of the formula (I), and is generally composed of the stimulable phosphor and a binder in which the phosphor is dispersed. The phosphor layer may contain other stimulable phosphors and/or additives such as a colorant.

A process for the preparation of the radiation image storage panel of the invention is described, referring to a typical radiation image storage panel comprising a support and a phosphor layer provided thereon which comprises a binder and a stimulable phosphor dispersed therein.

The phosphor layer can be provided on the support, for example, by the following process.

The stimulable phosphor and a binder are added to an appropriate solvent, and they are well mixed to prepare a coating dispersion for the formation of a phosphor layer in which the stimulable phosphor particles are uniformly dispersed. A ratio of the binder and the phosphor in the coating dispersion is determined according to the characteristics of the aimed radiation image storage panel and the nature of the phosphor employed. Generally, the ratio is in the range of 1:1 to 1:100 (binder:phosphor, weight ratio), preferably 1:8 to 1:40.

The coating dispersion containing the phosphor particles and the binder is then coated evenly on the surface of a support to form a layer of the coating dispersion. The coating procedure can be carried out by a conventional method such as a method of using a doctor blade, a roll coater or a knife coater.

A support material employable in the invention can be selected from those employed in the conventional radiographic intensifying screens or those employed in the known radiation image storage panels. In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For example, an adhesive layer or subbing layer may be provided by coating a polymer material such as gelatin over the surface of the support on the phosphor layer side. Otherwise, a light-reflecting layer or a light-absorbing layer may be provide by forming a polymer material layer containing a light-reflecting material such as titanium dioxide or a light-absorbing material such as carbon black. One or more of these additional layers may be provided on the support, and the constitution thereof can be optionally selected depending upon the purpose of the radiation image storage panel.

The phosphor layer-side surface of the support (or the surface of an adhesive layer, a light-reflecting layer, or light-absorbing layer in the case that such layers are provided on the phosphor layer) may be provided with protrusions and depressions for enhancement of sharpness of the resulting radiation image.

The coating dispersion is coated over the support as described above. Then the coated layer of the dispersion is dried to form a stimulable phosphor layer on the support. The thickness of the phosphor layer varies depending upon the characteristics of the aimed radiation image storage panel, the nature of the phosphor, the ratio of the binder and the phosphor, etc. Generally, the thickness of the phosphor layer is in the range of 20 $\mu$m to 1 mm, preferably in the range of 50 to 500 $\mu$m.

The phosphor layer can be provided on the support by processes other than that given in the above. For example, the phosphor layer is initially prepared on a sheet (false support) such as a glass plate, metal plate or plastic sheet using the aforementioned coating dispersion and thus prepared phosphor layer is then overlaid on the genuine support by pressing or using an adhesive agent.

The radiation image storage panel of the invention generally has a protective film on a free surface of the phosphor layer. The protective film can be provided on the phosphor layer by evenly coating the surface of phosphor layer, using a doctor blade or the like, with a solution which is prepared by dissolving an organic polymer material such as cellulose derivative or polymethyl methacrylate in an appropriate solvent, and drying the coated solution. Alternatively, the protective film can be provided on the phosphor layer by beforehand preparing a protective film from a plastic sheet of polyethylene terephthalate, etc. or a transparent glass sheet, followed by placing and fixing it onto the phosphor layer with an appropriate adhesive agent. Otherwise, the protective film can be also provided by depositing inorganic material on the phosphor layer. Further, the protective layer may be a coating film formed of a fluoro-resin capable of being dissolved in an organic solvent, in which perfluoroolefin resin powders or silicon resin powders may be dispersed.

For the purpose of enhancing the sharpness of the resulting image, at least any one of the above-mentioned film and layers constituting the radiation image storage panel of the invention may be colored with such a colorant as that absorbs only stimulating rays and does not absorb the stimulated emission, or a coloring intermediate layer containing the colorant may be independently provided.

By utilizing the above-mentioned processes, the tetradecahedral rare earth activated alkaline earth metal fluorohalide phosphor of the formula (I) and the radiation image storage panel of the invention which has a phosphor layer comprising the stimulable phosphor and a binder can be prepared.

EXAMPLE 1

A precursor of europium activated barium fluorobromide stimulable phosphor was prepared in the following manner.

Into a reaction vessel (volume: 4,000 ml), 1,200 ml of aqueous $BaBr_2$ solution (2.5 mol./l), 40 ml of aqueous $EuBr_3$ solution (0.2 mol./l) and 1,760 ml of water were introduced. The reaction mother liquid (concentration of $BaBr_2$: 1.0 mol./l) in the vessel was heated and kept at 60° C., and stirred at the rate of 500 r.p.m. by means of a screw-type stirring propeller (diameter: 60 mm). Independently, 150 ml of aqueous $NH_4F$ solution (10 mol./l) and 150 ml of water were mixed, and 300 ml of the mixture was poured into the mother liquid (which was kept at 60° C. with stirring) at the rate of 5 ml/minute by means of a roller pump to prepare a precipitate. The reaction liquid was further stirred at 60° C. for 2 hours to ripen the precipitate. The ripened precipitate was collected by filtration and washed with 2 liters of methanol, and then dried under vacuum at 120° C. for 4 hours. Thus, about 330 g of crystalline precursor of europium activated barium fluorobromide was prepared. The crystal shape of the obtained precursor was observed by means of a scanning electron microscope, and found that most of the grains had the tetradecahedral shape. The mean grain size of the crystalline grains was also measured by a grain size distribution counter of light-diffraction type (Horiba LA-500), and found to be 5.0 $\mu$m.

For preventing change of the grain size distribution which is apt to be caused by change of the crystal shape and/or agglomeration of the grains during firing procedure, very fine powdery alumina was added to the obtained precursor in the amount of 1 weight % and well mixed by a mixer so that fine particles of alumina might be uniformly attached onto the surface of the precursor grains. Subsequently, 100 g of the obtained mixture was charged into a quartz boat, which was then placed into a tube-type electric furnace for firing. The firing was conducted at 850° C. for two hours in a nitrogen gas atmosphere to prepare europium activated barium fluorobromide phosphor grains. The obtained grains were observed by a scanning electron microscope, and found that most of the grains had tetradecahedral shape, which was the same as the precursor grains. The electron microscopic photographs of the obtained phosphor were shown in FIGS. 2, 3 and 4, of which magnifications were ×2000, ×5000 and ×10000, respectively. The mean grain size of the phosphor grains was then measured by the grain size distribution counter of light-diffraction type, and found to be 5.0 μm, which was the same as the precursor grains.

EXAMPLE 2

The procedure of Example 1 was repeated except that the reaction mother liquid (concentration of $BaBr_2$: 1.25 mol./l) was prepared from 1,500 ml of aqueous $BaBr_2$ solution (2.5 mol./l), 50 ml of aqueous $EuBr_3$ solution (0.2 mol./l) and 1,450 ml of water, and that the aqueous fluoride solution to be poured into the mother liquid was prepared from 190 ml of aqueous $NH_4F$ solution (10 mol./l) and 190 ml of water. Thus, about 420 g of a crystalline precursor of europium activated barium fluorobromide was prepared. The crystal shape of the obtained precursor was observed by a scanning electron microscope, and found that most of the grains had tetradecahedral shape. The mean grain size of the crystalline grains was also found to be 3.5 μm.

After very fine powdery alumina was added to the obtained precursor, the mixture was subjected to firing in the same manner as in Example 1 to prepare europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 3.5 μm, which was the same as the precursor grains.

EXAMPLE 3

The procedure of Example 1 was repeated except that the reaction mother liquid (concentration of $BaBr_2$: 1.0 mol./l) was prepared from 1,200 ml of aqueous $BaBr_2$ solution (2.5 mol./l), 40 ml of aqueous $EuBr_3$ solution (0.2 mol./l), 29.8 g of KBr and 1,760 ml of water. Thus, about 330 g of a crystalline precursor of potassium added europium activated barium fluorobromide was prepared. The crystal shape of the obtained precursor was observed by a scanning electron microscope, and found that most of the grains had tetradecahedral shape. The mean grain size of the crystalline grains was also found to be 4.7 μm.

After very fine powdery alumina was added to the obtained precursor, the mixture was subjected to firing in the same manner as in Example 1 to prepare potassium added europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 4.7 μm, which was the same as the precursor grains.

EXAMPLE 4

The procedure of Example 1 was repeated except that the reaction mother liquid (concentration of $BaBr_2$: 1.0 mol./l) was prepared from 1,200 ml of aqueous $BaBr_2$ solution (2.5 mol./l), 40 ml of aqueous $EuBr_3$ solution (0.2 mol./l), 0.85 g of $CaBr_2 \cdot 2H_2O$ and 1,760 ml of water. Thus, about 330 g of a crystalline precursor of calcium added europium activated barium fluorobromide was prepared. The crystal shape of the obtained precursor was observed by a scanning electron microscope, and found that most of the grains had tetradecahedral shape. The mean grain size of the crystalline grains was also found to be 4.9 μm.

After very fine powdery alumina was added to the obtained precursor, the mixture was subjected to firing in the same manner as in Example 1 to prepare calcium added europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 4.9 μm, which was the same as the precursor grains.

EXAMPLE 5

The procedure of Example 1 was repeated except that the reaction mother liquid (concentration of $BaBr_2$: 1.0 mol./l) was prepared from 1,200 ml of aqueous $BaBr_2$ solution (2.5 mol./l), 40 ml of aqueous $CeBr_3$ solution (0.2 mol./l) and 1,760 ml of water. Thus, about 330 g of a crystalline precursor of cerium activated barium fluorobromide was prepared. The crystal shape of the obtained precursor was observed by a scanning electron microscope, and found that most of the grains had tetradecahedral shape. The mean grain size of the crystalline grains was also found to be 5.2 μm.

After very fine powdery alumina was added to the obtained precursor, the mixture was subjected to firing in the same manner as in Example 1 to prepare cerium activated barium fluorobromide phosphor grains. The obtained grains were observed by a scanning electron microscope, and found that most of the grains had tetradecahedral shape, which was the same as the precursor grains. The mean grain size of the phosphor grains was also found to be 5.2 μm, which was the same as the precursor grains.

EXAMPLE 6

The procedure of Example 1 was repeated except for using 30 ml of aqueous KF solution (2.5 mol./l) as starting material of the aqueous fluoride solution to be poured into the mother liquid, to obtain 160 g of a crystalline precursor of potassium added europium activated barium fluorobromide. The crystal shape of the obtained precursor was observed by a scanning electron microscope, and found that most of the grains had tetradecahedral shape. The mean grain size of the crystalline grains was also found to be 3.2 μm.

After very fine powdery alumina was added to the obtained precursor, the mixture was subjected to firing in the same manner as in Example 1 to prepare potassium added europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 3.2 μm, which was the same as the precursor grains.

EXAMPLE 7

Into a reaction vessel (volume: 4000 ml), 2,700 ml of aqueous $NH_4Br$ solution (4.5 mol./l), 15 ml of aqueous $EuBr_3$ solution (0.2 mol./l) and 285 ml of water were poured. The reaction mother liquid in the vessel was heated and kept at 60° C., and stirred at the rate of 500 r.p.m. by a screw-type stirring propeller (diameter: 60 mm). Independently, 60 ml of aqueous $NH_4F$ solution (10 mol./l) and 180 ml of water were mixed to prepare 240 ml of aqueous $NH_4F$ mixture.

Into the mother liquid stirred at 60° C., 120 ml of $BaBr_2$ aqueous solution (2.5 mol./l) was poured at the rate of 5 ml/minute by means of a roller pump, and then another 120 ml of aqueous $BaBr_2$ solution (2.5 mol./l) and the above-prepared aqueous $NH_4F$ mixture were poured together at the rate of 5 ml/minute to prepare a precipitate. The reaction liquid was further stirred at 60° C. for 2 hours so as to ripen the precipitate. The ripened precipitate was collected by filtration and washed with 2 liters of methanol, and dried under vacuum at 120° C. for 4 hours. Thus, about 120 g of a crystalline precursor of europium activated barium fluorobromide was prepared. The crystal shape of the obtained precursor was observed by a scanning electron microscope, and found that most of the grains had tetradecahedral shape. The mean grain size of the crystalline grains was found to be 4.8 μm.

After very fine powdery alumina was added to the obtained precursor, the mixture was subjected to firing in the same manner as in Example 1 to prepare europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 4.8 μm, which was the same as the precursor grains.

EXAMPLE 8

The procedure of Example 1 was repeated except that the reaction mother liquid and the aqueous fluoride solution were mixed in a mixing chamber which was provided in the reaction vessel in such form as to enclose the stirring propeller, whereby about 330 g of a crystalline precursor was prepared. The crystal shape of the obtained precursor was observed by a scanning electron microscope, and found that most of the grains had tetradecahedral shape. The mean grain size of the crystalline grains was also found to be 5.0 μm.

After very fine powdery alumina was added to the obtained precursor, the mixture was subjected to firing in the same manner as Example 1 to prepare europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 5.0 μm, which was the same as the precursor grains. Thus prepared phosphor grains were found to have higher uniformity in their shape than those of Example 1.

EXAMPLE 9

The procedure of Example 1 was repeated except that the firing was conducted in a mixed gas atmosphere of nitrogen and oxygen (2 torr), to prepare europium activated barium fluorobromide phosphor grains. The obtained grains were observed by a scanning electron microscope, and found that most of the grains had tetradecahedral shape, which was the same as the precursor grains. The mean grain size of the phosphor grains was also found to be 5.0 μm, which was the same as the precursor grains.

EXAMPLE 10

Into a reaction vessel (volume: 4,000 ml), 2,000 ml of aqueous $NH_4Br$ solution (3.0 mol./l), 12.5 ml of aqueous $EuBr_3$ solution (0.2 mol./l), 1.18 g of $CaBr_2 \cdot 2H_2O$, and 19.7 g of KBr were introduced. The reaction mother liquid was heated and kept at 60° C., and stirred at 500 r.p.m. by a screw-type stirring propeller (diameter: 60 mm).

Then, 50 ml of aqueous $NH_4F$ solution (10 mol./l) and 200 ml of an aqueous $BaBr_2$ solution (2.5 mol./l) were supplied into the mother liquid (which was kept at 60° C. with stirring) at the rates of 1 ml/min. and 4 ml/min., respectively, by means of a high precision cylinder pump to prepare a precipitate. The reaction liquid was further stirred at 60° C. for 2 hours to ripen the precipitate. The ripened precipitate was collected by filtration and washed with 2 liters of methanol, and then dried under vacuum at 120° C. for 4 hours. Thus, about 110 g of a crystalline precursor of potassium calcium added europium activated barium fluorobromide was prepared. The crystal shape of the obtained precursor was observed by means of a scanning electron microscope, and found that most of the grains had the tetradecahedral shape. Further, it was found that the crystalline precursor has an aspect ratio of about 3.

The obtained crystalline precursor is further processed in the manner as described in Example 1 to prepare potaassium calcium activated europium activated barium fluorobromide phosphor grains. The obtained grains were observed by a scanning electron microscope, and found that most of the grains had tetradecahedral shape, which was the same as the precursor grains. The electron microscopic photographs of the obtained phosphor were shown in FIGS. 5 and 6, of which magnifications were ×500 and ×1500, respectively. The aspect ratio of the phosphor grains was then measured and found to be about 3, which was the same as the precursor grains.

Subsequently, an example of preparation of a radiation image storage panel according to the invention is described below.

EXAMPLE 11

The radiation image storage panels each of which had a phosphor layer of different thickness were prepared in the following manner.

As materials of phosphor layer, 356 g of a potassium added europium activated barium fluorobromide phosphor (BaFBr:0.0003K,0.005 Eu) obtained in Example 3, 15.8 g of a polyurethane resin (binder, Desmolac 4125 of Sumitomo Bayer Urethane Co., Ltd.) and 2.0 g of an epoxy resin (bisphenol A type) were added to a mixture solvent of methyl ethyl ketone and toluene (methyl ethyl ketone:toluene=1:1), and they were mixed using a propeller mixer to prepare a coating dispersion for the formation of a phosphor layer having a viscosity of 25 to 30 PS.

The coating dispersion was coated on a poly(ethylene terephthalate) film provided with a subbing layer using a doctor blade, and the coated dispersion layer was heated and cured to dryness at 100° C. for 15 minutes, to form a phosphor layer of each aimed thickness.

Subsequently, as materials of protective film, 70 g of a fluoro-resin (fluoroolefin/vinylether copolymer, Lumifron LF100 of Asahi Glass Co., Ltd.), 25 g of isocyanate (cross-linking agent, Desmodule Z4370 of Sumitomo Bayer Urethane Co., Ltd.), 5.0 g of an epoxy resin (bisphenol A type) and 10 g of silicone resin fine powders (particle size: 1–2 μm, KPM-590 of Shin-etsu Chemical Industry Co., Ltd.) were added to a mixture solvent of toluene and isopropyl alcohol (toluene:isopropyl alcohol=1:1) and they were mixed to prepare a coating solution for the formation of a protective film.

The coating solution was coated on the phosphor layer formed beforehand on the poly(ethylene terephthalate) film using a doctor blade, and the coated layers were heated and cured to dryness at 120° C. for 30 minutes, to form a protective film having thickness of 10 μm. Thus, each radiation image storage panel of the present invention having a phosphor layer of different thickness was prepared.

Evaluation of Radiation Image Storage Panel

Each of the radiation image storage panels obtained in Example 10 was exposed through CTF chart to X-rays at voltage of 80 KVp, and subsequently scanned with the He-Ne laser beam (wavelength: 632.8 nm) to excite the phosphor. The light emitted by the stimulable phosphor layer was detected by a photosensor (photomultiplier having spectral sensitivity of type S-5). From the electric signals, a radiation image was reproduced as a visible image on a display by means of an image-reproducing apparatus. Thus, as for each of the radiation image storage panels, the visible image of CTF chart was obtained. According to each image, contrast transfer function (CTF) was measured and the measured function was represented by the CTF value at the spatial frequency of 2 cycle (lp)/mm.

Figure 7:
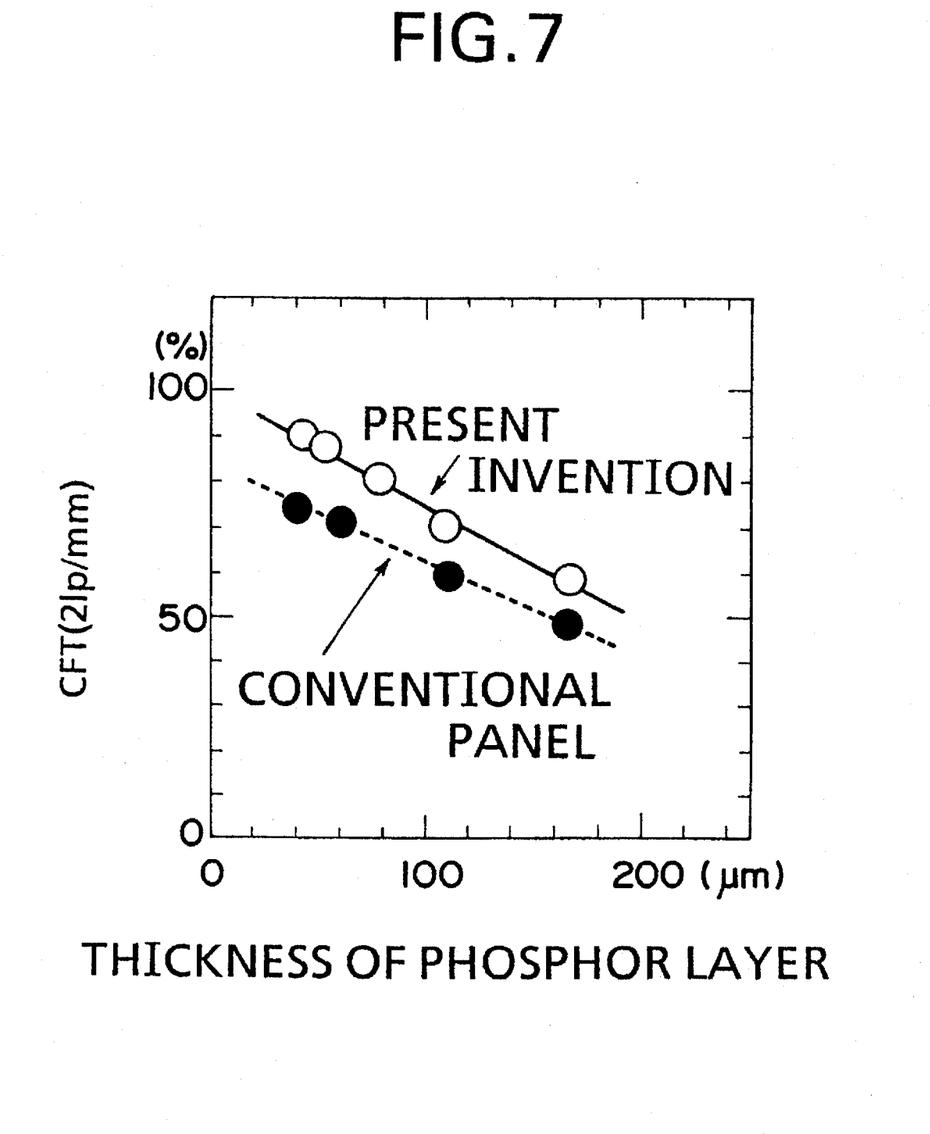
FIG. 7 is a graph showing tendency of sharpness of radiation image storage panels employing the tetradecahedral rare earth activated alkaline earth metal fluorohalide phosphor of the invention and a radiation image storage panel employing the conventional tabular rare earth activated alkaline earth metal fluorohalide phosphor.

In FIG. 7, the CTF values of the radiation image storage panels of the invention having phosphor layers of various thicknesses are given.

As a comparison example, a potassium added europium activated barium fluorobromide phosphor was prepared by the conventional method, in which starting materials were mixed in an aqueous suspension. From thus prepared phosphor, a radiation image storage panel was prepared in the same manner as in Example 11. The CTF value of the panel was measured and the obtained value is also shown in FIG. 7.

Figure 8:
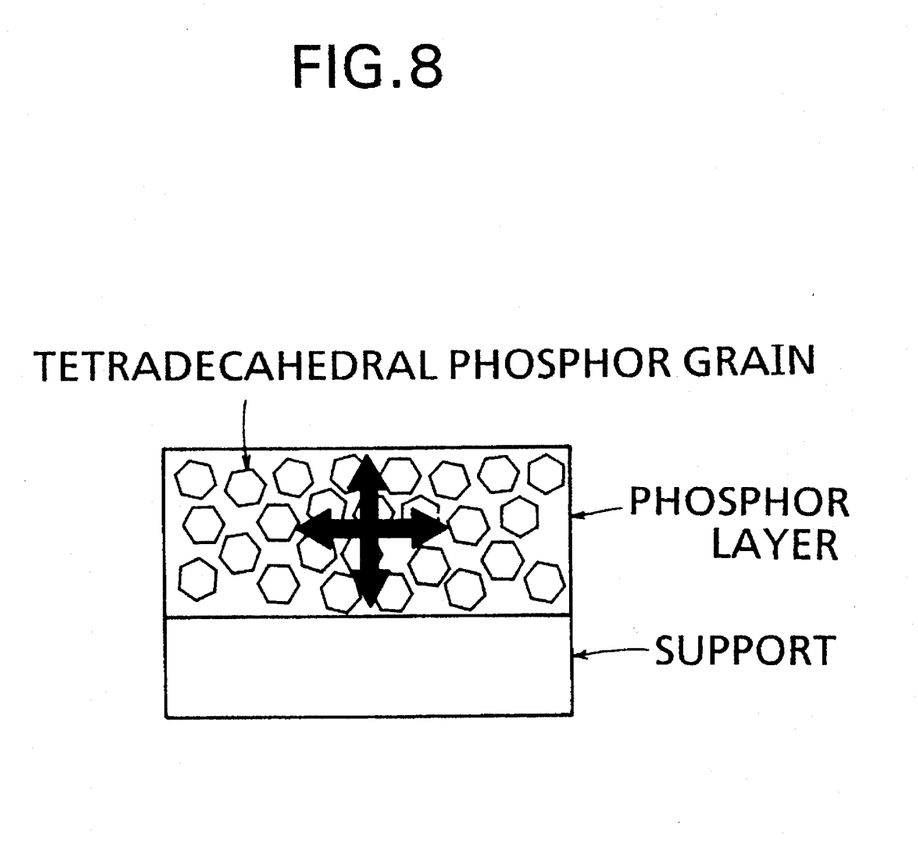
FIG. 8 is a schematic view showing arrangement of a tetradecahedral rare earth activated alkaline earth metal fluorohalide phosphor of the invention in a phosphor layer of a radiation image storage panel, and it also shows directions of light scattering in the phosphor layer.

As is apparent from the results shown in FIG. 7, it is confirmed that the radiation image storage panel of the invention gives an image of improved sharpness. The reason of this effect is presumed as follows: the grains of the stimulable phosphor of the invention (i.e., tetradecahedral rare earth activated alkaline earth metal fluorohalide) are arranged randomly in all directions in the phosphor layer as shown in FIG. 8, and therefore the stimulating ray and the stimulated emission can be prevented from scattering in the unfavorable level direction.

We claim:

1. A process of the preparation for a tetradecahedral rare earth activated alkaline earth metal fluorohalide phosphor represented by the formula (I):

$$Ba_{1-x}M^{II}_xFX:yM^I,zLn \qquad (I)$$

wherein $M^{II}$ is at least one alkaline earth metal selected from the group consisting of Sr and Ca; $M^I$ is at least one alkaline metal selected from the group consisting of Li, Na, K, Rb and Cs; X is at least one halogen selected from the group consisting of Cl, Br and I; Ln is at least one rare earth element selected from the group consisting of Ce, Pr, Sm, Eu, Gd, Tb, Tm and Yb; and x, y and z are numbers satisfying the conditions of $0 \leq x \leq 0.5$, $0 \leq y \leq 0.05$ and $0 < z \leq 0.2$, respectively, which comprises the steps of:

preparing an aqueous solution which contains $BaX_2$, a halide of Ln, a halide of $M^{II}$ if x in the formula (I) is not 0, and a halide of $M^I$ if y in the formula (I) is not 0 and in which the concentration of $BaX_2$ is not more than 1.4 mol./l;

adding an aqueous solution of an inorganic fluoride to the above-prepared solution under the condition that the temperature of the latter solution is kept at 20°–100° C. to precipitate precursor crystals of the tetradecahedral rare earth activated alkaline earth rectal fluorohalide phosphor;

separating the precursor crystals from the aqueous solution; and firing the precursor crystals under the condition that the fired crystals are not sintered.

2. The process of the preparation for the tetradecahedral rare earth activated alkaline earth metal fluorohalide phosphor as defined in claim 1, wherein the inorganic fluoride is ammonium fluoride or an alkaline metal fluoride.

3. A process of the preparation for a tetradecahedral rare earth activated alkaline earth metal fluorohalide phosphor represented by the formula (I):

$$Ba_{1-x}M^{II}_xFX:yM^I,zLn \qquad (I)$$

wherein $M^{II}$ is at least one alkaline earth metal selected from the group consisting of Sr and Ca; $M^I$ is at least one alkaline metal selected from the group consisting of Li, Na, K, Rb and Cs; X is at least one halogen selected from the group consisting of Cl, Br and I; Ln is at least one rare earth element selected from the group consisting of Ce, Pr, Sm, Eu, Gd, Tb, Tm and Yb; and x, y and z are numbers satisfying the conditions of $0 \leq x \leq 0.5$, $0 \leq y \leq 0.05$ and $0 < z \leq 0.2$, respectively, which comprises the steps of:

preparing an aqueous solution which contains an ammonium halide, a halide of Ln, a halide of $M^{II}$ if x in the formula (I) is not 0, and a halide of $M^I$ if y in the formula (I) is not 0 and in which the concentration of the ammonium halide is in the range of 2.5 mol./l to 4.5 mol./l;

adding an aqueous solution of an inorganic fluoride and an aqueous solution of $BaX_2$ to the above-prepared solution under the conditions that the temperature of the latter solution is kept at 20°–100° C. and that the amount of fluoride in the former solution and the amount of Ba in the latter solution are controlled to give a constant ratio to precipitate precursor crystals of the tetradecahedral rare earth activated alkaline earth metal fluorohalide phosphor;

separating the precursor crystals from the aqueous solution; and firing the precursor crystals under the condition that the fired crystals are not sintered.

4. The process of the preparation for the tetradecahedral rare earth activated alkaline earth metal fluorohalide phosphor as defined in claim 3, wherein the inorganic fluoride is ammonium fluoride or an alkaline metal fluoride.

5. A tetradecahedral rare earth activated alkaline earth metal fluorohalide phosphor prepared according to the process of claim 1.

6. A tetradecahedral rare earth activated alkaline earth metal fluorohalide phosphor prepared according to the process of claim 2.

7. A tetradecahedral rare earth activated alkaline earth metal fluorohalide phosphor prepared according to the process of claim 3.

8. A tetradecahedral rare earth activated alkaline earth metal fluorohalide phosphor prepared according to the process of claim 4.

* * * * *